United States Patent [19]
Adachi et al.

[11] Patent Number: 5,550,415
[45] Date of Patent: Aug. 27, 1996

[54] VEHICULAR ALTERNATING CURRENT GENERATOR

[75] Inventors: Katsumi Adachi; Kyoko Kurusu, both of Himeji, Japan

[73] Assignee: Mitsubishi Denki Kabushiki Kaisha, Tokyo, Japan

[21] Appl. No.: 240,461

[22] Filed: May 10, 1994

[30]  Foreign Application Priority Data

Jan. 17, 1994 [JP] Japan .................................. 6-003034

[51] Int. Cl.⁶ ...................... H02K 11/00; H02K 13/06; H02K 13/00
[52] U.S. Cl. .................. 310/68 R; 310/72; 310/221; 310/239
[58] Field of Search .................... 310/51, 68 R, 310/72, 220, 221, 239

[56]  References Cited

U.S. PATENT DOCUMENTS

| | | | |
|---|---|---|---|
| 3,219,860 | 11/1965 | Redick et al. | 310/239 |
| 3,496,394 | 2/1970 | Balcke et al. | 310/68 R |
| 4,504,752 | 3/1985 | Iwaki et al. | 310/68 R |
| 4,957,876 | 9/1990 | Shibata et al. | 437/209 |
| 5,231,321 | 7/1993 | Takiguchi | 310/51 |
| 5,432,225 | 7/1995 | Nakamura et al. | 524/495 |

FOREIGN PATENT DOCUMENTS

| | | | |
|---|---|---|---|
| 2486323 | 1/1982 | France | 310/239 |
| 163547 | 7/1987 | Japan . | |
| 60422 | 2/1990 | Japan . | |
| 2044552 | 10/1980 | United Kingdom | 310/68 R |

*Primary Examiner*—Clayton E. LaBalle
*Attorney, Agent, or Firm*—Sughrue, Mion, Zinn, MacPeak & Seas

[57] ABSTRACT

A vehicular alternating current generator having a base 1 attached with at least one of a brush holder 2 and a voltage regulator and a condenser 5 attached to the base for preventing an electric noise, wherein a main body of the condenser is isolated from an outside atmosphere by a resin 13 and is disposed in a condenser accommodating body 11 while connecting leads 5a of the condenser are exposed to the outside of the condenser accommodating body and a holding portion 10 is formed in the base for accommodating the condenser accommodating body.

5 Claims, 9 Drawing Sheets

5,550,415

VEHICULAR ALTERNATING CURRENT GENERATOR

BACKGROUND OF THE INVENTION

1. Field of the Invention

The present invention relates to an alternating current generator for charging a battery of a vehicle, particularly to a structure for attaching a condenser for preventing an electric noise of an alternating current generator.

2. Discussion of Background

Generally, an alternating current generator for an automobile is installed with a condenser for preventing an electric noise in the output circuit of the generator from transmitting to a car radio or other electronic instruments by absorbing a voltage surge originated from the generator.

The conventional condenser for preventing an electric noise of this kind is normally installed at the outside of a bracket of the generator, and its output terminals are fastened to the bracket by nuts through insulating parts. According to such a mounting system, the output terminals may be shortcircuited since galvanic corrosion is caused when muddy water containing salt components, or the like adheres to the insulating parts.

In consideration of the above drawback, there is a tendency in recent years to arrange the condenser for preventing an electric noise at the inside of a bracket of an alternating current generator for an automobile. However, it is difficult to attach the condenser in a narrow space of the generator without receiving influences of an inside temperature, vibration and humidity, and such that the integrating operation can simply be performed. Therefore, the installation has been a painstaking operation.

For instance, there is a conventional example for arranging a condenser for preventing an electric noise at the inside of a bracket of a generator, as shown in FIGS. 11 through 13.

In FIGS. 11 through 13, reference numeral 1 designates a base for a voltage regulator which is installed at the inside of a bracket of a generator, numeral 2 designates a brush holder integrally formed with the base 1, numeral 3 designates a penetration hole provided in the base 1, numeral 4 designates a connector integrally formed with the base 1, and numeral 5 designates a condenser for preventing an electric noise, which is installed in the base 1 and which is fixed to a recess 7 of the base 1 for attaching a condenser by a filler resin 6 for fixing the condenser and for waterproofing. Numeral 8 designates insert terminals of the base 1, to which connecting leads 5a of the condenser, are soldered.

In such a conventional example, the condenser 5 is accommodated in the recess 7 of the base 1 for attaching a condenser, the connecting leads 5a are connected to the insert terminals 8 by soldering, and the filler resin (for instance, an epoxy resin) 6 is injected and solidified around the condenser thereby fixing the condenser 5 to the base 1. This filler resin 6 requires substantially one day to solidify and is resilient after the solidification, which provides waterproofing, dustproofing, insulation and the like for the condenser 5.

In the conventional vehicular alternating current generator, the filler resin 6 is filled in the recess 7 of the base 1 for attaching a condenser. Therefore, a direction for injecting the filler resin 6 from the outside of the base 1 and a direction for soldering the connecting leads 5a to the insert terminals 8 therefrom are different, i.e. directed toward opposite faces of the base 1. Accordingly, the faces for working the base 1 are reversed in manufacturing it, which increases the integration steps of the base 1, and a space for the integrating operation is required since the bulky base 1 has to be left as it is for solidifying the filler resin 6, which increases the production cost.

SUMMARY OF THE INVENTION

It is an object of the present invention to resolve such a drawback, and to provide a vehicular alternating current generator capable of dispensing with a time period for solidifying the resin in a state in which a condenser accommodating body has been integrated to the base, by solidifying the resin for isolating a condenser for preventing an electric noise from the outer atmosphere in a step of forming the condenser accommodating body, and thereby capable of reducing the integrating steps of the base, reducing the space for the integrating operation and reducing the production cost.

Further, it is an object of the present invention to provide a vehicular alternating current generator capable of firmly fixing a holding portion of the base with the condenser accommodating body by protruding at least one of contact portions of a holding portion of the base and the condenser accommodating body, by which variations in dimensions of the contact portions are absorbed.

Further, it is an object of the present invention to provide a vehicular alternating current generator capable of performing an automatic insertion (integration) by chamfering at least one of an edge of the condenser accommodating body for inserting the condenser accommodating body into the holding portion and an edge of an insertion hole of the holding portion, whereby the inserting operation is smoothly performed.

According to a first aspect of the present invention, there is provided a vehicular alternating current generator having a base attached with at least one of a brush holder and a voltage regulator and a condenser attached to the base for preventing an electric noise, wherein a main body of the condenser is isolated from an outside atmosphere by a resin and is accommodated in a condenser accommodating body while connecting leads of the condenser are exposed to the outside of the condenser accommodating body and a holding portion is formed in the base for accommodating the condenser accommodating body.

According to a second aspect of the present invention, there is provided the vehicular alternating current generator according to the first aspect, wherein at least one of contact portions of the holding portion and the condenser accommodating body for contacting the holding portion with the condenser accommodating body is or are protruded.

According to a third aspect of the present invention, there is provided the vehicular alternating current generator according to the first or second aspect, wherein the condenser accommodating body is formed in a box-like shape, an insertion hole is formed in the base for inserting the condenser accommodating body thereby constituting the holding portion, and at least one of a first edge of the condenser accommodating body on a side thereof for inserting the condenser accommodating body into the insertion hole and a second edge of the insertion hole corresponding to the first edge is chamfered.

According to the first aspect of the present invention, the main body of the condenser for preventing an electric noise is isolated from the outer atmosphere by a resin and is accommodated in the condenser accommodating body while exposing its connecting leads to the outside, and the holding portion is formed in the base in which the condenser accommodating body is retained. Therefore, the time period for solidifying the resin is not necessary in a state in which the condenser accommodating body has been integrated to the base. Therefore, it is possible to restrict the faces for working the base to a single face for soldering the connecting leads of the condenser for preventing an electric noise.

According to the second aspect of the present invention, at least one of the contact portions of the holding portion of the base and the condenser accommodating body, is protruded. Therefore, the condenser accommodating body is held and its position is restrained by deforming the protrusion or protrusions in inserting the condenser accommodating body into the holding portion.

According to the third aspect of the present invention, at least one of the edge of the condenser accommodating body for inserting the condenser accommodating body into the holding portion and the edge of the insertion hole of the holding portion, is chamfered. Therefore, the inserting operation can smoothly be performed.

DETAILED DESCRIPTION OF PREFERRED EMBODIMENTS

EXAMPLE 1

Figure 1:
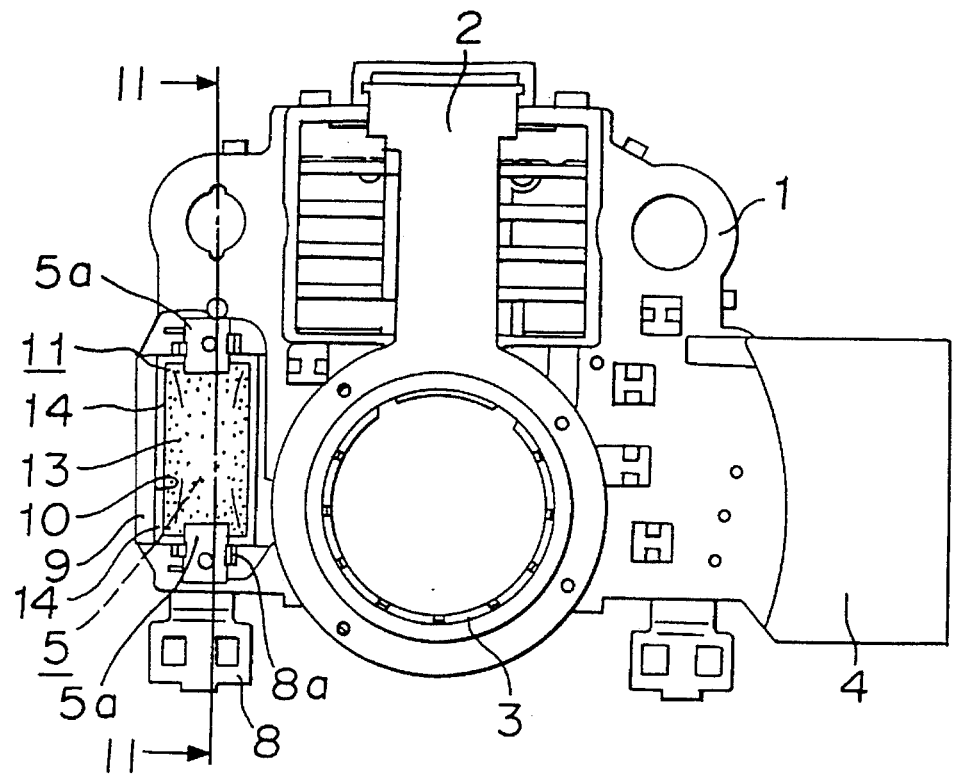
FIG. 1 is a front diagram of a base showing Example 1 of the present invention.
Figure 2:
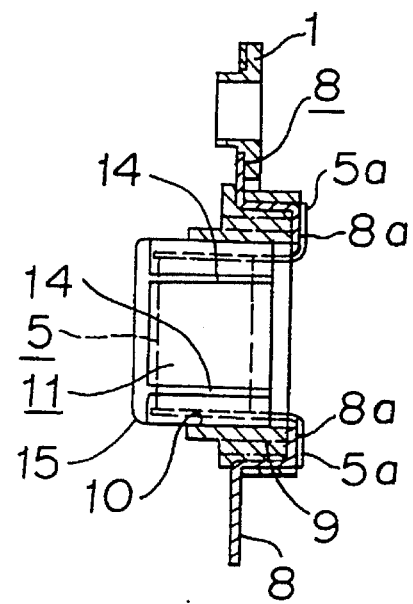
FIG. 2 is a partially sectional diagram taken along the line II—II of FIG. 1.
Figure 3:
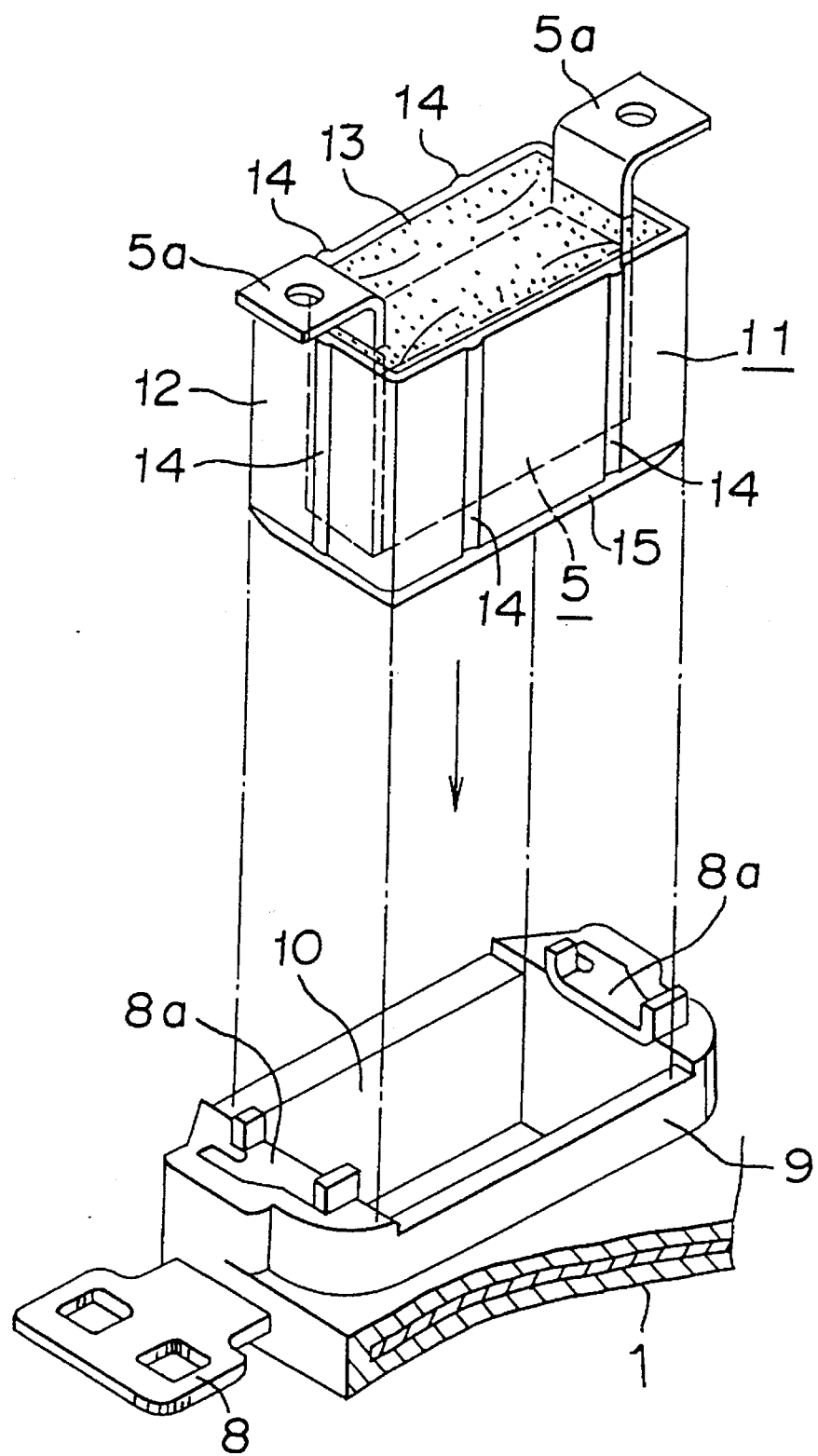
FIG. 3 is an exploded perspective view of FIG. 2.

An explanation will be given of an example of this invention in reference to FIGS. 1 through 3. FIG. 1 is a front diagram of a base, FIG. 2 is a sectional diagram taken along line II—II of FIG. 1, and FIG. 3 is an exploded perspective view of FIG. 2. Portions the same as or corresponding to those in the conventional Example are attached with the same notations and the explanation will be omitted.

In FIGS. 1 through 3, reference numeral 9 designates a case portion for attaching a condenser constituting a holding portion integrally formed with the base 1, in which an insertion hole 10 is molded. Numeral 11 designates a box-like condenser accommodating body, comprising a molded case 12 made of polyester resin (polybutylene terephthalate; PBT) which can be inserted into the insertion hole 10, and a filler resin 13 accommodating a condenser 5 for preventing an electric noise in the molding case 12 by embedding it in the filler resin 13. The filler resin 13 employs, for instance, an epoxy resin which requires substantially one day for solidifying it and is resilient after solidification. In the condenser accommodating body 11, the main body of the condenser 5 is isolated from the outer atmosphere by the filler resin 13, and its connecting leads 5a are protruded toward the outside such that they fit to channel-like terminals 8a of the insert terminal 8 when the condenser accommodating body 11 is inserted in the hole 10. Numeral 14 designates protrusions provided on side faces of the condenser accommodating body 11 which are integrated with the side faces of the molding case 12. Numeral 15 designates a chamfer formed at an edge of the condenser accommodating body 11 for inserting the condenser accommodating body 11 into the insertion hole 10, which is formed at the insertion edge of the molding case 12 incorporating the protrusions 14.

The condenser accommodating body 11 is inserted into the insertion hole 10 of the case portion 9 to attach the condenser, the channel-like terminal portions 8a are caulked to thereby pinch the connecting leads 5a by the terminal portions 8a, and thereafter the connecting leads 5a are soldered to the terminal portions 8a. Then, the condenser accommodating body 11 can be fixed to the case portion 9 for attaching the condenser, as shown in FIGS. 1 and 2. Therefore, the time period for solidifying the filler resin 13 in the state wherein the condenser accommodating body 11 has been integrated with the base 1, is not necessary, and the work on the base can be restricted to a single face of the base on which the connecting leads 5a are soldered.

Further, the insertion hole 10 of the case portion 9 for attaching the condenser penetrates through both faces of the base 1 which is a through-hole structure. Therefore, its cooling function is improved and the device is thermally advantageous.

Further, the condenser accommodating body 11 is a finished part in which the main body of the condenser 5 for preventing an electric noise has previously been embedded into the molding case 12 by the filler resin 13 to accommodate the main body in the molding case while being isolated from the outer atmosphere. Therefore, a single size of the condenser accommodating body 11 can correspond to different sizes of condensers through embedding condensers having different sizes in accordance with the condenser capacitances into the molding case 12. Accordingly, a single kind of the base 1 can correspond to many kinds of condensers having various condenser capacitances.

EXAMPLE 2

Figure 4:
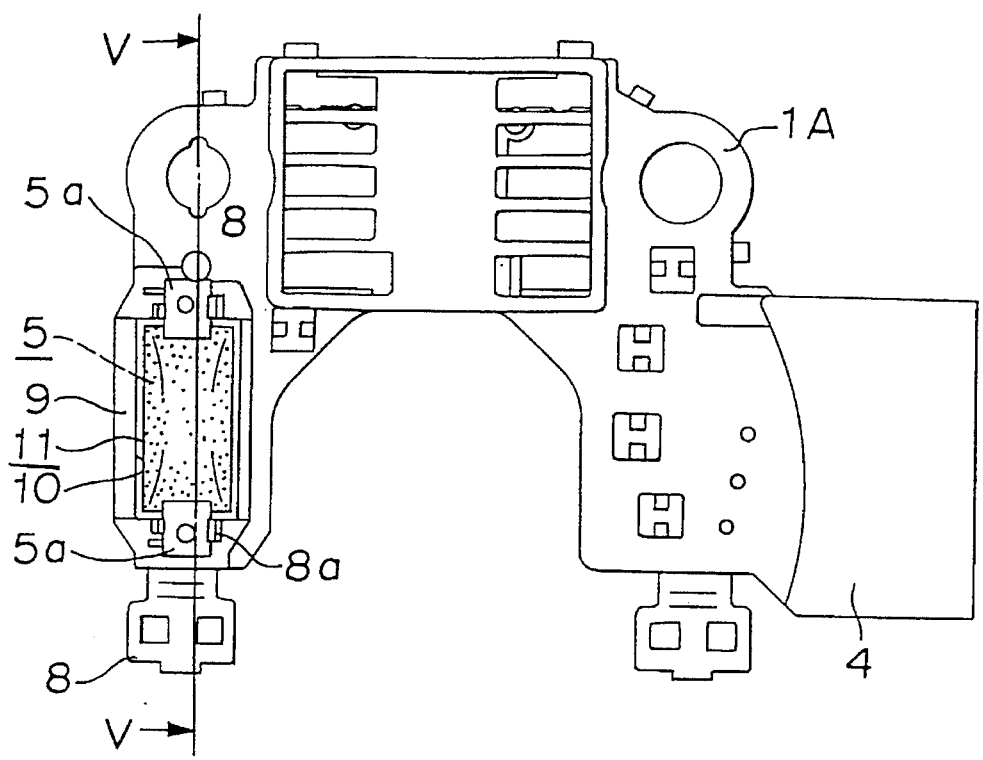
FIG. 4 is a front diagram of a base showing Example 2 of the present invention.
Figure 5:
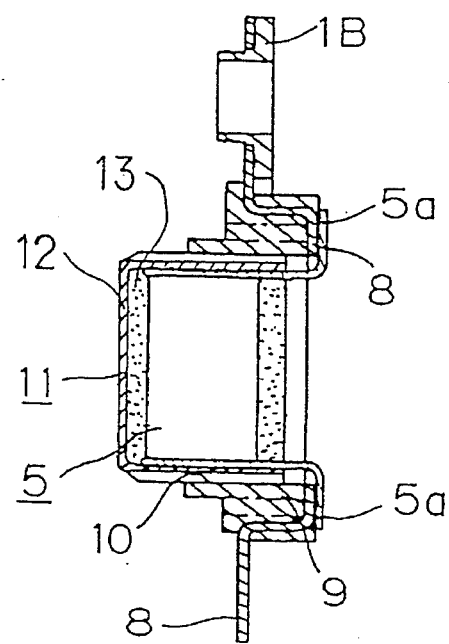
FIG. 5 is a sectional diagram taken along the line V—V of FIG. 4.

In the above Example 1, a type is shown in which the brush holder 2 is integrally formed with the base 1 for a voltage regulator, that is, the voltage regulator and the brush holder 2 are composed in the base 1. However, a similar effect can be provided in a base 1A having no brush holder 2 as shown in FIGS. 4 and 5, that is, a regulator case. Example 2 is similar to Example 1 in inserting and holding the condenser accommodating body 11 in the insertion hole 10, although the illustration is omitted.

EXAMPLE 3

Figure 6:
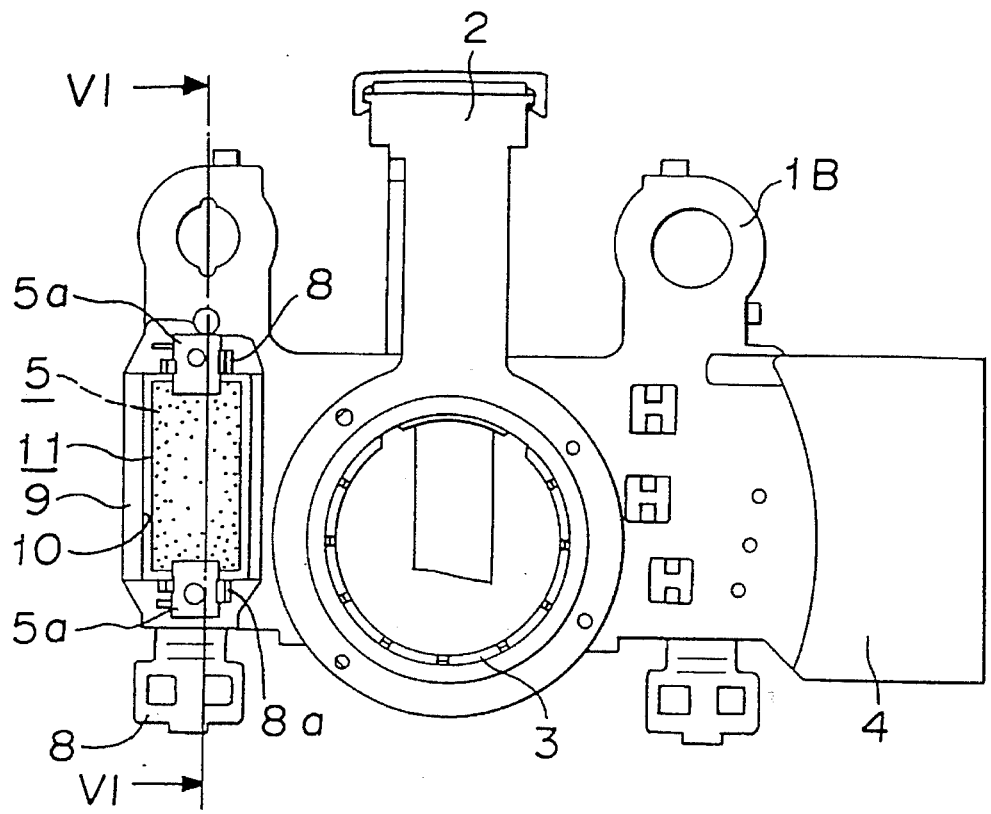
FIG. 6 is a front diagram of a base showing Example 3 of the present invention.
Figure 7:
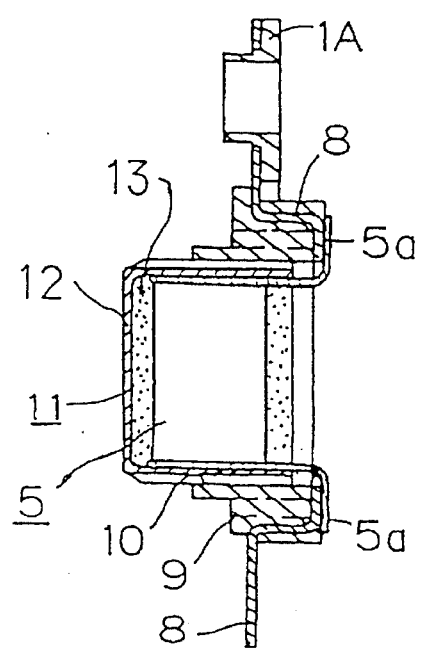
FIG. 7 is a sectional diagram taken along the line VI—VI of FIG. 6.

In the above Examples 1 and 2, the base 1 is provided with the voltage regulator. However, a similar effect can be achieved in an example in which the base is a base 1B of the brush holder 2 as shown in FIGS. 6 and 7. Example 3 is similar to Example 1 in inserting and holding the condenser accommodating body 11 in the insertion hole 10, although the illustration is omitted.

EXAMPLE 4

As described in the above Examples 1 through 3, when the protrusions 14 are provided on the side faces of the condenser accommodating body 11, the protrusions 14 are deformed by the inner peripheral face of the insertion hole 10 in inserting the condenser accommodating body 11 into the insertion hole 10. Polyester resin (PBT) has a property of elastic deformation. Therefore, the condenser accommodating body 11 is firmly held and its position is restrained. Variations in dimensions of the insertion hole 10 or the molding case 12 of the condenser accommodating body 11 are absorbed by deforming the protrusions 14.

EXAMPLE 5

Figure 8:
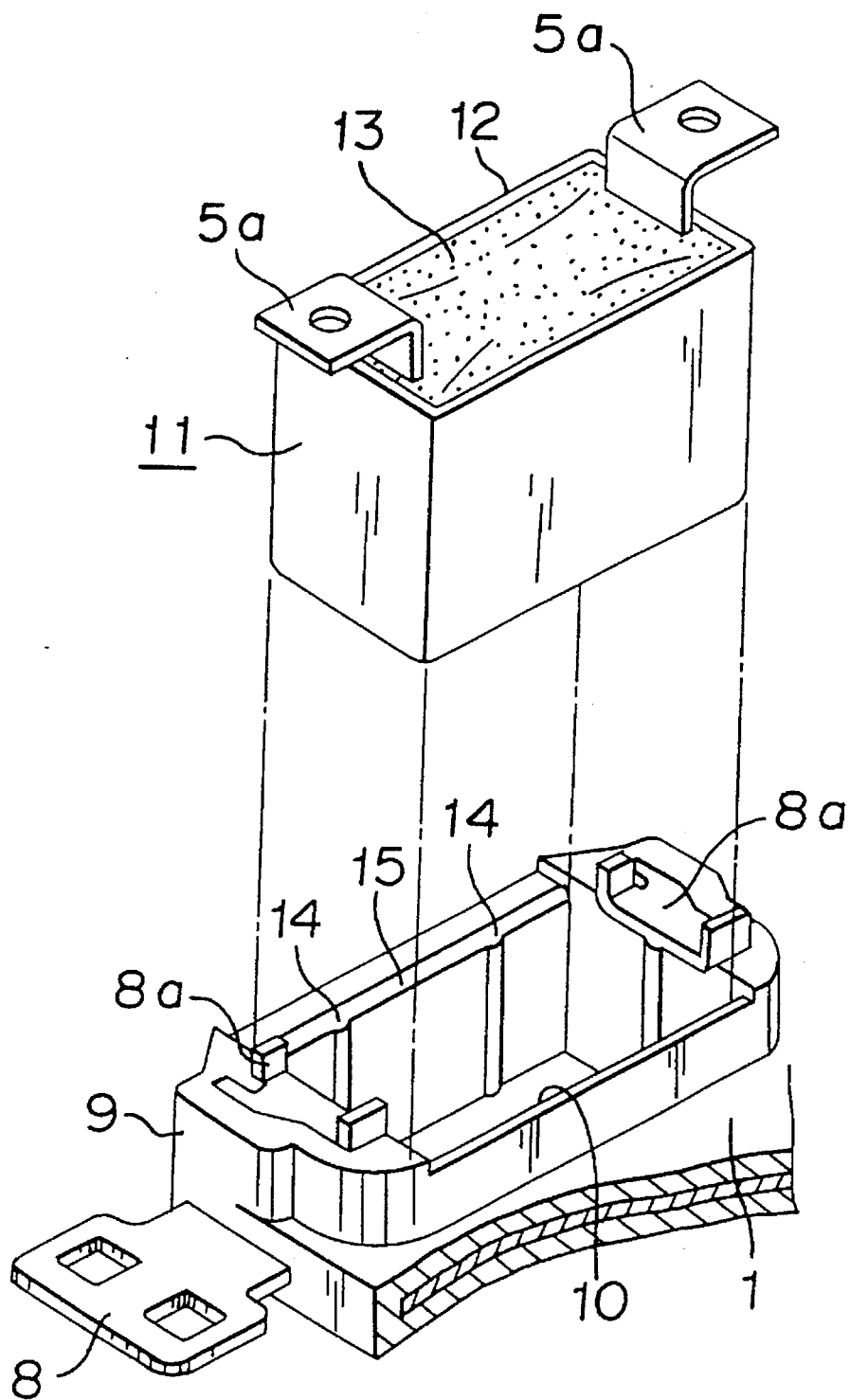
FIG. 8 is an exploded perspective view of important parts showing Example 5 of the present invention.

In the above Examples 1 through 4, the protrusions 14 are provided on the side faces of the condenser accommodating body 11. However, a similar effect can be provided by installing the protrusions 14 on the inner peripheral face of the insertion hole 10 and by providing a chamfer 15 on the edge of the insertion hole incorporating the protrusions 14, as shown in FIG. 8.

EXAMPLE 6

Figure 9:
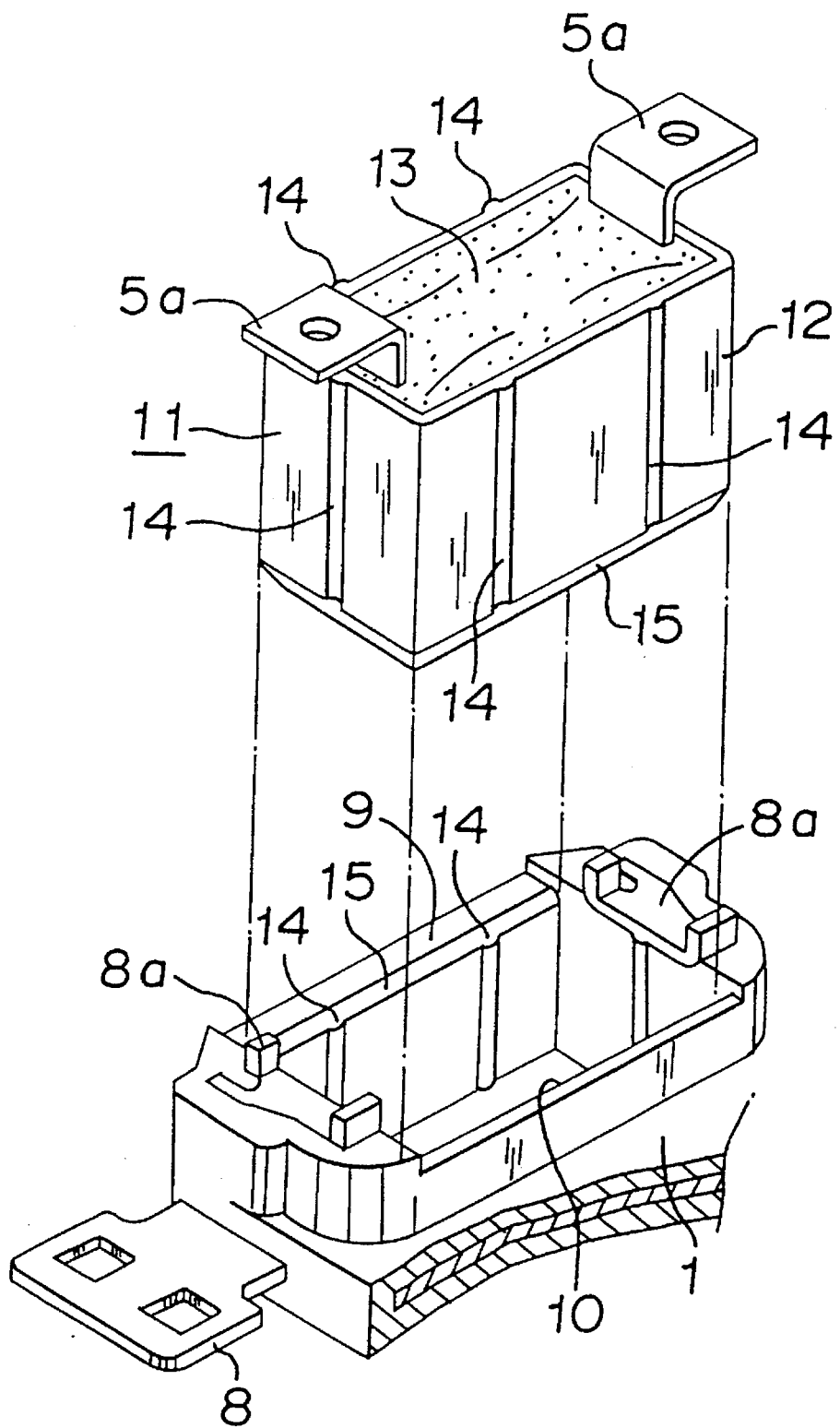
FIG. 9 is an exploded perspective view of important parts showing Example 6 of the present invention.

In the above Examples 1 through 5, the protrusions 14 are installed on either one of the side faces of the condenser accommodating body 11 and the inner peripheral face of the insertion hole 10. However, a similar effect can be provided by installing the protrusions 14 on both of the side faces of the condenser accommodating body 11 and the inner peripheral face of the insertion hole 10 as shown in FIG. 9.

EXAMPLE 7

Figure 10A:
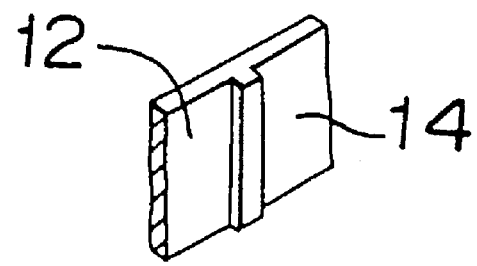
FIGS. 10(a), 10(b) and 10(c) are perspective views of important parts showing Example 7 of the present invention.
Figure 10B:
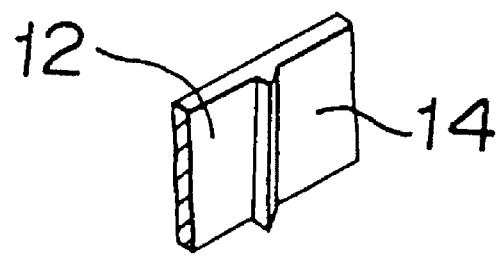
Figure 10C:
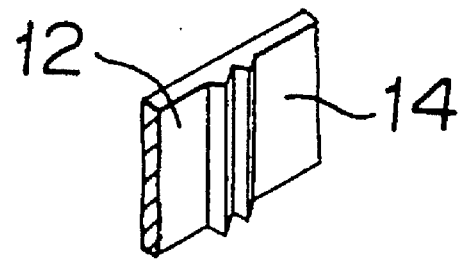
Figure 11:
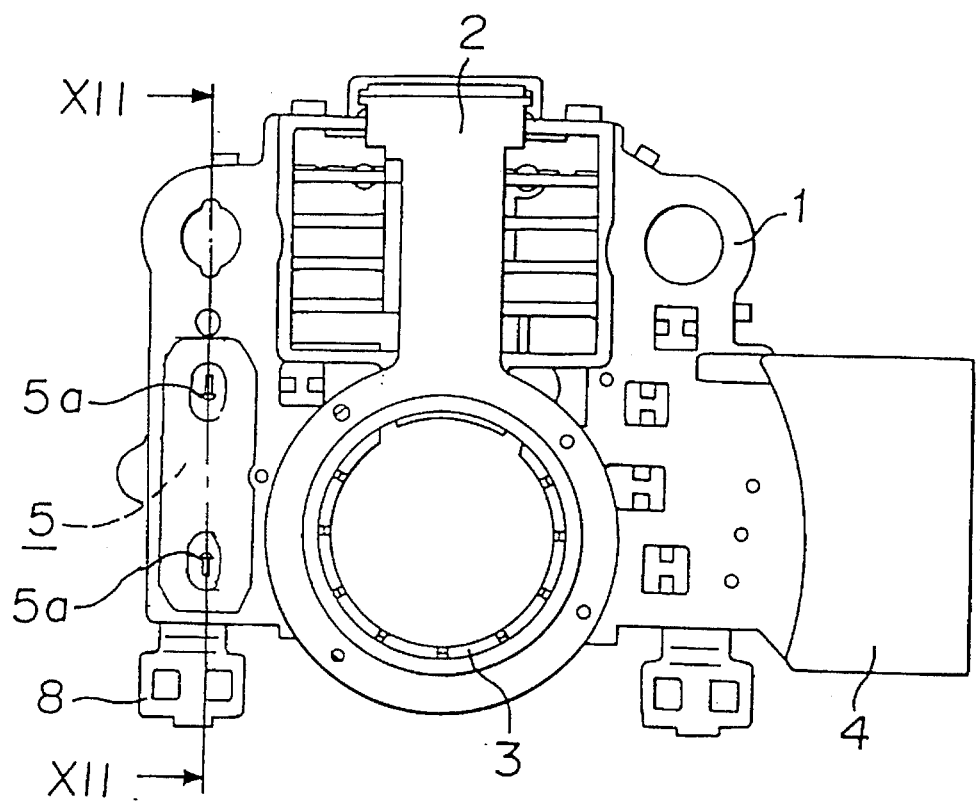
FIG. 11 is a front diagram of a base showing a conventional example.
Figure 12:
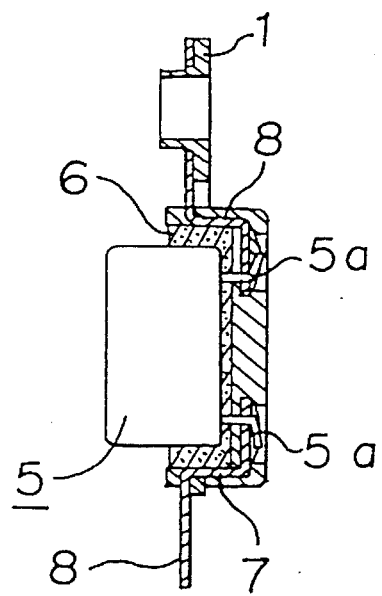
FIG. 12 is a sectional diagram taken along the line VII—VII of FIG. 11.
Figure 13:
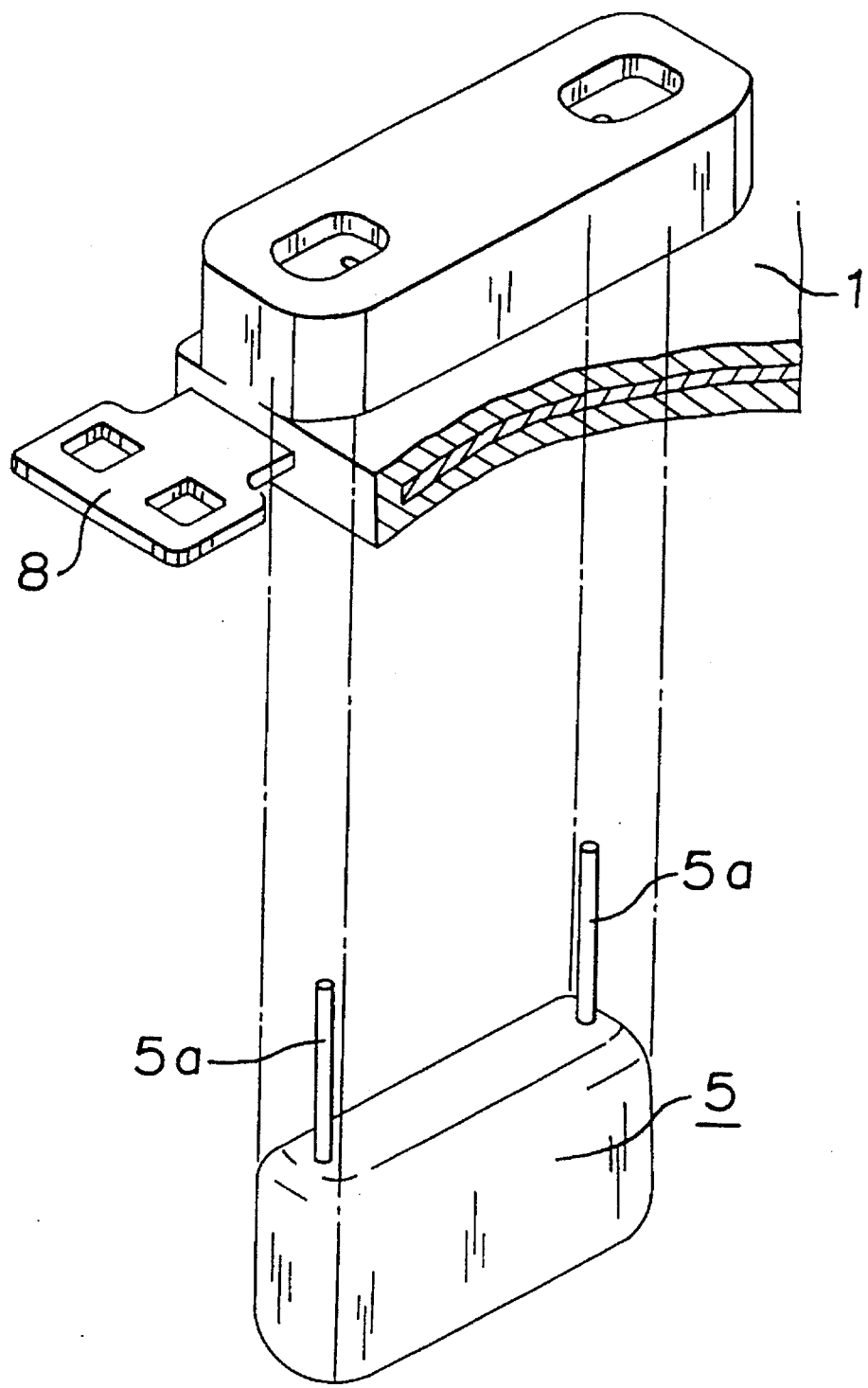
FIG. 13 is an exploded perspective view of FIG. 12.

In the above Examples 1 through 6, the sectional shape of the protrusions 14 is semicircular. However, a similar effect can be achieved in the other sectional shape, for instance, a square shape as shown in FIG. 10(a), a triangular shape as shown in FIG. 10(b) or a double triangular shape as shown in FIG. 10(c).

EXAMPLE 8

When the chamfer 15 is formed on the edge of the condenser accommodating body 11 for inserting the condenser accommodating body 11 into the insertion hole 10 as shown in the above Examples 1 through 3, the inserting operation can be performed smoothly with the chamfer 15 as a guide. By this means, an automatic insertion (integration) is made possible.

EXAMPLE 9

In the above Examples 1 through 3 and 8, the chamfer 15 is formed on the edge of the condenser accommodating body 11 for inserting the condenser accommodating body 11 into the insertion hole 10. However, a similar effect can be provided by forming the chamfer on the edge of the insertion hole of the case portion 9 for attaching the condenser as shown in FIG. 8.

EXAMPLE 10

In the above Examples 1 through 3, 8 and 9, the chamfer 15 is formed on either one of the edge of the condenser accommodating body 11 for the insertion and the edge of the insertion hole of the case portion 9 for attaching the condenser. However, a similar effect can be achieved by forming the chamfers on both of the edge of the condenser accommodating body 11 for the insertion and the edge of the insertion hole of the case portion 9 for attaching the condenser as shown in FIG. 9.

Further, the filler resin 13 is not restricted to an epoxy resin, but may be a silicone resin or other resins so far as they have functions of waterproof, insulation and the like. Further, the filler resin 13 may naturally be provided with a resilience to a degree necessary for its design.

As stated above, according to the present invention, by performing the solidification of a resin for isolating the condenser for preventing an electric noise from the outer atmosphere in the stage of manufacturing the condenser accommodating body, the time period for solidifying the resin in the state in which the condenser accommodating body has been integrated with the base, is not necessary, by which the effect of shortening the procedure of the integrating the base and the reduction of the space for the integrating operation can be achieved and the production cost can be reduced.

Further, according to this invention, the effect is achieved in which the holding portion of the base and the condenser accommodating body can firmly be fixed with each other by absorbing the variations in dimensions of the respective contact portions of the holding portion and the condenser accommodating body through protruding at least one of the both contact portions.

Further, according to the present invention, the effect can be achieved wherein the inserting operation is smoothly performed and the automatic inserting (integration) can be achieved by chamfering at least one of the edge of the condenser accommodating body for the insertion and the edge of the insertion hole of the holding portion.

What is claimed is:

1. A vehicular alternating current generator having a base attached to at least one of a brush holder and a voltage regulator, and a condenser attached to a holding portion formed in the base for suppressing electric noise, wherein a main body of the condenser is encapsulated by a resin and accommodated in a condenser accommodating body, and connecting leads of the condenser protrude from an exposed surface of the condenser accommodating body when the condenser accommodating body is inserted in the holding portion formed in the base.

2. The vehicular alternating current generator according to claim 1, wherein at least one of the holding portion and the condenser accommodating body have deformable protrusions for firmly securing the condenser accommodating body in the holding portion.

3. The vehicular alternating current generator according to claim 1 or claim 2, wherein the condenser accommodating body is substantially box shaped, the holding portion comprises a through hole formed in the base, and at least one of a leading edge of the condenser accommodating body in a direction of insertion of the condenser accommodating body into the through hole and an edge of the through hole corresponding to the leading edge is chamfered.

4. The vehicular alternating current generator according to claim 1 or claim 2, wherein the resin is an epoxy resin.

5. The vehicular alternating current generator according to claim 3, wherein the resin is an epoxy resin.

* * * * *